(12) United States Patent
Mitchell et al.

(10) Patent No.: US 7,626,169 B1
(45) Date of Patent: Dec. 1, 2009

(54) OPTICAL REFERENCE, AND A METHOD OF USING SAME

(75) Inventors: Daniel B. Mitchell, Port McNicoll (CA); Geoffrey G. Harris, Midland (CA); Douglas J. Brown, Midland (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/133,949

(22) Filed: Jun. 5, 2008

(51) Int. Cl.
*G01J 5/00* (2006.01)
(52) U.S. Cl. ...................................... 250/351
(58) Field of Classification Search .................. 250/351; 356/330
See application file for complete search history.

(56) References Cited

U.S. PATENT DOCUMENTS

| 3,578,975 A | * | 5/1971 | Wheeler | .................. 250/201.2 |
| 5,148,233 A | * | 9/1992 | Imamura et al. | ......... 356/243.1 |
| 5,811,811 A | * | 9/1998 | Naya | ..................... 250/339.15 |

* cited by examiner

*Primary Examiner*—Constantine Hannaher
(74) *Attorney, Agent, or Firm*—Haynes and Boone, LLP

(57) ABSTRACT

A detector calibration reference is disposed along a path of travel for radiation that extends from a radiation source to a radiation detector. The detector calibration reference has mutually exclusive first and second portions that are offset in a direction transverse to the path of travel, the first portion being substantially opaque to radiation from the source, and the second portion being substantially transmissive to radiation from the source. The detector calibration reference is moved relative to the path of travel in a manner so that the first and second portions become successively aligned with the path of travel.

13 Claims, 2 Drawing Sheets

OPTICAL REFERENCE, AND A METHOD OF USING SAME

FIELD OF THE INVENTION

This invention relates in general to calibration of optical measurement systems and, more particularly, to optical references for calibration, and calibration techniques that use optical references.

BACKGROUND

Optical systems have been developed that are used to make optical measurements. For example, a spectrophotometer is an optical system than can be used to measure the level of transmission or absorption of a sample material with respect to a number of different wavelengths of radiation. A spectrophotometer has a radiation source that transmits radiation along a path of travel to a radiation detector. During operational use, the sample under test is positioned optically between the source and the detector, along the path of travel. Radiation from the source that is traveling along the path of travel must pass through the sample, and the detector measures the intensity of received radiation, which represents the amount of radiation that is able to pass through the sample. The accuracy of optical measurements provided by such a system depends on the accuracy of the calibration of the system.

It is relatively simple to calibrate a spectrophotometer for a transmissivity of 0% and/or a transmissivity of 100%. In particular, it is easy to completely block the radiation beam, or to leave it completely unblocked. However, radiation detectors are typically nonlinear, and in fact there may be differences in the nonlinearity of equivalent detectors that in theory should be identical. Consequently, calibrating for only 0% and/or 100% is not sufficient. It is desirable to perform calibration for one or more different levels of transmissivity that are between 0% and 100%. This can improve the accuracy of the calibration, for example by an average of a factor of ten.

A related consideration is that radiation detectors are not always spatially uniform. For example radiation impinging on one portion of the detector may produce a different measurement than if that same radiation were to impinge on a different portion of the same detector.

To calibrate for a level of transmissivity between 0% and 100%, a traditional approach is to insert a stationary optical reference (or several successive stationary references) between the source and detector. Each such optical reference has a known transmissivity. One known type of optical reference is a filter with a known transmissivity, typically a neutral density filter. However, filters of this type work only for particular wavelength ranges. Further, materials in the filter may gradually deteriorate and change performance, due to handling, exposure and/or aging. Care must be taken to avoid abrading, scratching or otherwise altering the filter. Moreover, contaminates from the air can accumulate on the filter, altering performance. Cleaning the surface of the filter to remove contaminates may alter the performance of the filter.

A different type of known optical reference is made from a material that is well characterized. For example, the optical reference may be a piece of calcium fluoride ($CaF_2$). This type of reference can be more stable than a neutral density filter, but is still subject to some of the same problems. Further, only a limited selection of transmissivity levels may be available. For example, in the visible spectrum, there are very few materials having a transmissivity in the 0% to 70% range.

Thus, although existing optical references and calibration techniques have been generally adequate for their intended purposes, they have not been satisfactory in all respects. For example, existing optical references used for calibration are not always durable, stable and highly accurate, and cannot always be obtained for every desired level of transmissivity.

BRIEF DESCRIPTION OF THE DRAWINGS

A better understanding of the present invention will be realized from the detailed description that follows, taken in conjunction with the accompanying drawing, in which.

DETAILED DESCRIPTION

Figures 1, 2:
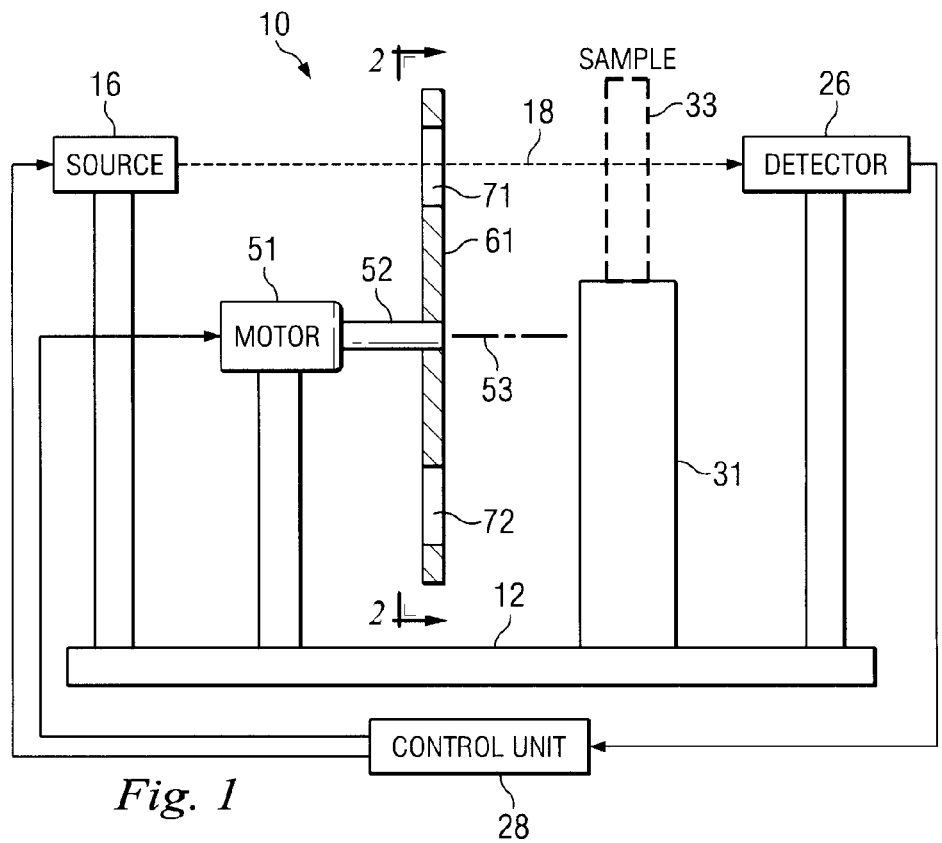
FIG. 1 is diagrammatic view of an apparatus that is a spectrophotometer embodying aspects of the invention, and that includes a detector calibration reference.
FIG. 2 is a diagrammatic sectional view, taken along the section line 2-2 in FIG. 1.

FIG. 1 is a diagrammatic view of an apparatus that is a spectrophotometer 10, and that embodies aspects of the invention. The spectrophotometer 10 includes a base 12. A radiation source 16 of a known type is fixedly supported on the base 12, and emits a beam of radiation that propagates along a path of travel 18. The beam includes radiation having a range of different wavelengths.

A radiation detector 26 of a known type is fixedly supported on the base 12, at a location that is spaced optically from the source 16, and that is at an end of the path of travel 18 remote from the source 16. A control unit 28 controls the source 16, and receives signals from the detector 26.

A support 31 is fixedly provided on the base 12. During normal operation, a sample 33 can be removably and stationarily supported on the support 31. The sample 33 is shown in broken lines in FIG. 1, because the focus of the present discussion is calibration of the spectrophotometer 10, and the sample 33 is not present during calibration. During normal operation, radiation from the source 16 propagates along the path of travel 18 to the sample 33. A portion of that radiation will be absorbed and/or reflected by the sample. The rest of the radiation will pass through the sample 33, and continue along the path of travel 18 to the detector 26. For each of a number of different wavelengths, the detector 26 measures the amount of radiation at that wavelength arriving at the detector, which represents the level of transmissivity of the sample 33 for that particular wavelength.

In order to ensure that measurements taken with the spectrophotometer 10 are accurate, the spectrophotometer must be periodically calibrated in relation to a known reference. It is relatively straightforward to calibrate for transmissivity levels of 0% and 100%. For 100%, radiation is allowed to travel from the source 16 along the path of travel 18 to the detector 26, without encountering or passing through any physical structure. For 0%, the source 16 can be turned off, or a not-illustrated part that is completely non-transmissive can be provided along the path of travel, for example in place of the sample 33. But it is desirable to calibrate for more than just a transmissivity of 0% and/or a transmissivity of 100%. This is because the detector 26 is nonlinear, and in fact the nonlinearity may differ from one detector 26 to another detector that in theory should be identical to the detector 26. As explained earlier, the traditional calibration approaches for transmissivities between 0% and 100% have been adequate for their intended purposes, but have not been completely satisfactory. The spectrophotometer 10 therefore includes some additional structure that is provided for the purpose of calibration.

In more detail, a motor 51 of a known type is fixedly supported on the base 12. In the disclosed embodiment, the motor 51 is a stepper motor, but it could alternatively be any other suitable type of motor. The motor is controlled by the control unit 28. The motor 51 has a shaft 52 that rotates about an axis 53. The axis 53 extends approximately parallel to the path of travel 18. A detector calibration reference 61 is fixedly mounted on the shaft 52, for rotation therewith. FIG. 2 is a diagrammatic sectional view of the shaft 52 and the calibration reference 61, taken along the section line 2-2 in FIG. 1.

As discussed above, the axis 53 in the disclosed embodiment extends approximately parallel to the path of travel 18. however, it would alternatively be possible for the axis 53 to extend at an angle to the path of travel 18. For example, the detector 26 may emit a small amount of heat, and where the detector 26 is used to measure infrared radiation, it is desirable that the calibration reference 61 not take heat emitted by the detector 26 and reflect that heat directly back to the detector 26. If the axis 53 is oriented at an angle to the path of travel 18, so that side surfaces of the calibration reference 61 are not perpendicular to the path of travel 18, then the calibration reference 61 will reflect heat from the detector 26 in a direction other then directly back to the detector 26.

In the disclosed embodiment, the calibration reference 61 is made of a material that fully blocks radiation from the source 16. In the disclosed embodiment, the calibration reference 61 is made from a material that is non-transmissive to radiation (0% transmissive), and in particular is made from a metal such as steel. However, it could alternatively be made from any other suitable material. As evident from FIGS. 1 and 2, the calibration reference 61 is a platelike circular disk. The calibration reference 61 has two openings 71 and 72 extending axially therethrough, on diametrically opposite sides of the shaft 52. In the disclosed embodiment, the calibration reference 61 has two openings 71 and 72. However, it would alternatively be possible to have only one opening, or to have more than two openings. In FIG. 2, the opening 72 has edges 76 and 77 on opposite sides thereof, and the edges 76 and 77 each extend radially with respect to the shaft 52. In addition, the opening 72 has inner and outer edges 78 and 79, each of which is an arc concentric to the shaft 52. The distance between the edges 78 and 79 is greater than the width of the beam of radiation produced by the source 16. The opening 71 has a configuration that is identical to that of opening 72, and the opening 71 is therefore not separately described here in detail.

Figure 3:
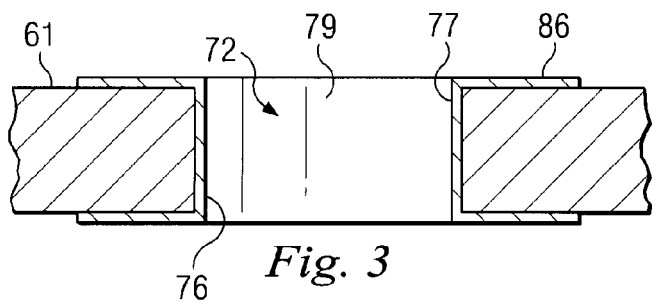
FIG. 3 is a diagrammatic fragmentary sectional view, taken along the section line 3-3 in FIG. 2.

FIG. 3 is a diagrammatic fragmentary sectional view taken along the section line 3-3 in FIG. 2. As shown in FIG. 3, an optional anti-reflection coating of a known type is provided on the edges of the opening 72, and on adjacent portions of the calibration reference 61. For simplicity and clarity, the coating 86 has been omitted in FIGS. 1 and 2. The coating 86 is made of a known material, and a similar coating would be provided in the region of the opening 71. In fact, the entire calibration reference 61 could be coated. During calibration of the system 10 of FIG. 1, the coating 86 prevents the edges 76 and 77 of the openings from reflecting light into the detector 26.

Figure 4:
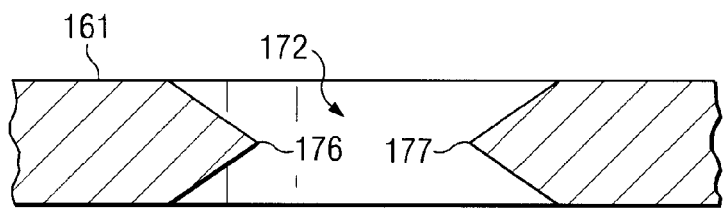
FIG. 4 is a diagrammatic fragmentary sectional view similar to FIG. 3, but showing part of a detector calibration reference that is an alternative embodiment of the detector calibration reference in the embodiment of FIGS. 1-3.

FIG. 4 is a diagrammatic fragmentary sectional view similar to FIG. 3, but showing part of a detector calibration reference 161 that is an alternative embodiment of the detector calibration reference 61 of FIGS. 1-3. The calibration reference 161 is generally identical to the calibration reference 61, except for differences that are discussed below. The calibration reference 161 has an opening 172 that is generally equivalent to the opening 72 except that, adjacent each of the radially extending edges 176 and 177, the calibration reference 161 tapers in thickness in a direction toward the opening 172. The edges 176 and 177 each have a shape that is referred to figuratively as a knife edge, although of course neither edge is actually as sharp as a knife. The tapering thickness adjacent these knife edges is an alternative technique for minimizing undesired reflections from the regions adjacent the edges 176 and 177.

With reference to FIGS. 1 and 2, during calibration the motor 51 effects rotation of the calibration reference 61. When the path of travel 18 is aligned with either one of the openings 71 or 72, radiation from the source 16 will travel through that opening and reach the detector 26. When neither of the openings 71 and 72 is aligned with the path of travel 18, the opaque material of the calibration reference 61 will completely block the radiation from the source 16, so that none of the radiation reaches the detector 26.

With reference to FIG. 2, it can be seen that radiation from the beam will be blocked during about 90% of the angular movement of the calibration reference 61, and will be passing through one or the other of openings 71 and 72 during the other 10% of angular movement. With reference to FIGS. 1 and 2, the motor 51 rotates the calibration reference 61 at a sufficiently high speed so that the radiation beam is chopped or interrupted at a frequency significantly higher than the sampling frequency of the detector 26, for example an order of magnitude higher. Stated differently, the radiation beam is chopped or interrupted with a frequency having a period that is much shorter than the sampling interval or response time of the detector 26. To avoid a beating effect, the calibration reference 61 should not be rotated at a speed that interrupts the beam at a direct multiple of the measurement frequency of the detector 26. But if the speed of rotation of the calibration reference 61 is sufficiently high, the likelihood of a beating effect becomes negligible.

Since the calibration reference 61 is rotated at relatively high speed, the detector 26 effectively sees an average of all the radiation passing through the rotating calibration reference 61, rather than alternating bursts of 0% and 100% radiation. Stated differently, the level of the average depends on the relative circumferential lengths of the openings 71 and 72 and the solid regions between these openings. In the case of the calibration reference 61, approximately 90% of the radiation emitted by the source 16 will be blocked by the calibration reference 61, while the other 10% will pass through the openings 71 and 72, and ultimately reach the detector 26. By altering the size of the openings and/or the number of openings in the calibration reference 61, the calibration reference 61 can be set to provide any desired transmissivity between 0% and 100%. At the completion of the calibration process, the motor 51 is stopped in a position where the shaft 52 is stationary, and holds the calibration reference 61 in a position where radiation from the source 16 passes through one of the two openings 71 and 72, without contacting any portion of the calibration reference 61. Alternatively, the calibration reference 61 could be removed from the shaft 52.

The calibration reference 61 shown in FIGS. 1-3 provides an optical reference for a selected but fixed level of transmissivity, such as 10%. In order to provide a different level of transmissivity, the calibration reference 61 would be detached from the shaft 52 of the motor 51, and replaced with a different calibration reference that is effectively identical to the calibration reference 61, except that it would have openings with a configuration and/or size different from the openings 71 and 72.

Figure 5:
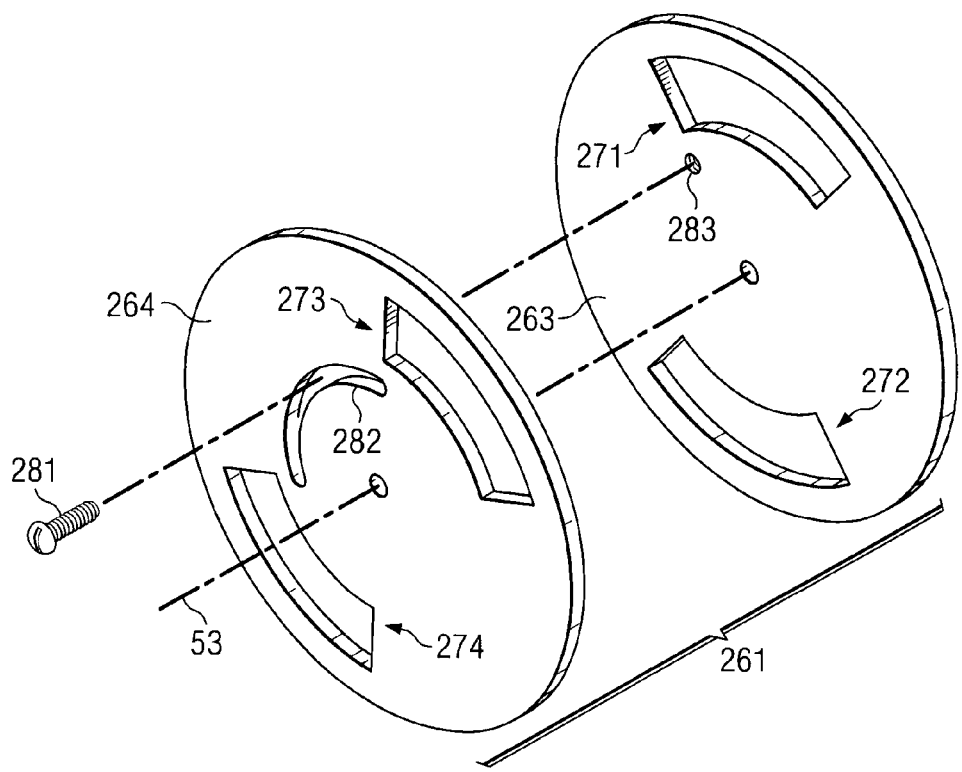
FIG. 5 is a diagrammatic exploded perspective view of a detector calibration reference that is an alternative embodiment of, and can be substituted for, the detector calibration reference in the embodiment of FIGS. 1-3.

FIG. 5 is a diagrammatic exploded perspective view of a detector calibration reference 261 that is an alternative embodiment of, and can be substituted for, the detector calibration reference 61 of FIGS. 1-3. The calibration reference 261 includes two circular plates 263 and 264. The plate 263 is fixedly secured to the motor shaft 52, and the plate 264 is rotatably supported on the shaft 52, so that it can be pivoted in relation to the plate 263. The plate 263 has two openings 271 and 272 that are generally similar to the openings 71 and 72 in FIG. 2, except that the openings 271 and 272 each have a circumferential length that is significantly longer than the circumferential length of the openings 71 and 72. The plate 264 has similar openings 273 and 274.

The plate 264 has an arcuate slot 282 that is concentric to the axis 53 of the motor shaft 52, and that has an angular length of approximately 90°. A screw 281 has a threaded shank that is slidably received within the slot 282, and that engages a threaded opening 283 provided in the calibration reference 263. If the screw 281 is tightened, the plate 264 is forced against the plate 263, so that friction prevents relative rotation of the plates 263 and 264. If the screw is 281 is loosened slightly, the plate 264 can be rotated with respect to the plate 263, while the shank of the screw slides within the slot 282. This permits variation of the amount of overlap between the openings 271 and 273, and the amount of overlap between the openings 272 and 274. This has the effect of varying the effective size of the openings through the overall calibration reference 261.

Not-illustrated indicia can be provided along the circumferential edges of the two plates 263 and 264. The indicia on one plate can be selectively aligned with indicia on the other plate to identify relative rotational positions of the plates 263 and 264 that would, for example, provide 5% transmissivity, 10% transmissivity, 15% percent transmissivity, and so forth. After the plates have been positioned so as to provide a desired level of transmissivity, the screw 281 can be tightened in order to releasably hold the two plates in that position.

The disclosed calibration references each limit the beam of radiation mechanically, such that calibration is not based on a sample that is referenced to a measurement previously made by a different optical device. The disclosed calibration references can be manufactured to great accuracy, thereby providing much more accurate reference values. Further, The disclosed calibration references can be readily manufactured to provide any desired level of transmissivity from 1% to 99%. In addition, the disclosed calibration references are not limited to particular wavelength ranges, but can be used for virtually any wavelength ranges of interest. Also, the disclosed calibration references are each made of metal, and are thus more durable than existing references. Scratches and/or contamination do not affect the performance of the disclosed calibration references, and the disclosed calibration references are not affected by temperature variations. Although the disclosed calibration references are discussed in association with a spectrophotometer, they can alternatively be used for calibrating other types of optical instruments.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising:
   a source that emits radiation, the radiation traveling away from said source along a path of travel;
   a radiation detector disposed along said path of travel at a location spaced optically from said source;
   a detector calibration reference disposed along said path of travel at a location optically between said source and said detector, said detector calibration reference having mutually exclusive first and second portions that are offset in a direction transverse to said path of travel, said first portion being substantially opaque to radiation from said source, and said second portion being substantially transmissive to radiation from said source; and
   support structure supporting said detector calibration reference for movement relative to said path of travel in a manner so that said first and second portions become successively aligned with said path of travel;
   wherein said detector calibration reference includes a member made of a material that is opaque to radiation from said source, said second portion defining an opening through said member, and said first portion being a part of said member that is free of an opening through said member, said opening defined by said second portion having opposite side edges that each extend transversely to a direction of movement of said second portion; and
   wherein said member includes anti-reflection structure adjacent each said side edge, said anti-reflection structure including said member tapering in thickness toward each said side edge.

2. An apparatus according to claim 1, wherein said support structure supports said detector calibration reference for rotation about an axis, said first and second portions being successively aligned with said path of travel in a cyclic manner, and said side edges of said opening defined by said second portion each extending substantially radially with respect to said axis.

3. An apparatus according to claim 2, wherein said support structure rotates said detector calibration reference at a speed that causes a beam of radiation from said source to be interrupted at a frequency having a period significantly shorter than a response time associated with said detector.

4. An apparatus according to claim 1, wherein said detector calibration reference has third and fourth portions that are mutually exclusive with respect to each other and with respect to said first and second portions, said third portion being substantially opaque to radiation from said source, and said fourth portion being substantially transmissive to radiation from said source, movement of said detector calibration reference by said support structure causing said first, second, third and fourth portions to become successively aligned with said path of travel in a cyclic manner, said fourth portion defining an opening through said member, and said third portion being a part of said member that is free of an opening through said member; said opening defined by said fourth portion having opposite side edges that each extend transversely to a direction of movement of said fourth portion, and said anti-reflection structure including said member tapering in thickness toward each said side edge of said opening defined by said fourth portion.

5. An apparatus according to claim 4, wherein said support structure supports said detector calibration reference for rotation about an axis, and wherein said side edges of said openings defined by said second and fourth portions each extend substantially radially with respect to said axis.

6. An apparatus according to claim 1, wherein said detector calibration reference is configured to permit variation of an effective size, in said direction of movement of said second portion, of said opening defined by said second portion.

7. An apparatus comprising:
a source that emits radiation, the radiation traveling away from said source along a path of travel;
a radiation detector disposed along said path of travel at a location spaced optically from said source;
a detector calibration reference disposed along said path of travel at a location optically between said source and said detector, said detector calibration reference having mutually exclusive first and second portions that are offset in a direction transverse to said path of travel, said first portion being substantially opaque to radiation from said source, and said second portion being substantially transmissive to radiation from said source; and
support structure supporting said detector calibration reference for movement relative to said path of travel in a manner so that said first and second portions become successively aligned with said path of travel;
wherein said detector calibration reference is configured to permit variation of an effective size in said direction of said second portion, and includes:
a first member having mutually exclusive first and second sections, said first section being substantially opaque to radiation from said source, said second section being substantially transmissive to radiation from said source, and said second section being larger than said second portion of said detector calibration reference;
a second member made of a material substantially opaque to radiation from said source, and supported for movement relative to said first member between two positions in which said second member provides different degrees of obstruction to radiation travel through said second section, wherein at any given point in time, said second portion is the portion of said second section currently unobstructed by said second member; and
securing structure for releasably physically securing said second member to said first member so that said second member is held in a selected position with respect to said first member.

8. A method comprising:
emitting radiation from a source, the radiation traveling away from said source along a path of travel;
detecting radiation with a radiation detector disposed along said path of travel at a location spaced optically from said source;
positioning a detector calibration reference along said path of travel at a location optically between said source and said detector, said detector calibration reference having mutually exclusive first and second portions that are offset in a direction transverse to said path of travel, said first portion being substantially opaque to radiation from said source, and said second portion being substantially transmissive to radiation from said source;
moving said detector calibration reference relative to said path of travel in a manner so that said first and second portions become successively aligned with said path of travel; and
configuring said detector calibration reference to include a member made of a material that is opaque to radiation from said source, said second portion defining an opening through said member, and said first portion being a part of said member that is free of an opening through said member, said opening defined by said second portion having opposite side edges that each extend transversely to a direction of movement of said second portion, and said member having adjacent each said side edge anti-reflection structure that includes said member tapering in thickness toward each said side edge.

9. A method according to claim 8, wherein said moving includes rotating said detector calibration reference about an axis, said first and second portions being successively aligned with said path of travel in a cyclic manner.

10. A method according to claim 9, wherein said rotating is carried out at a speed that causes a beam of radiation from said source to be interrupted at a frequency having a period significantly shorter than a response time associated with said detector.

11. A method according to claim 9,
including configuring said detector calibration reference to have third and fourth portions that are mutually exclusive with respect to each other and with respect to said first and second portions, said third portion being substantially opaque to radiation from said source, and said fourth portion being substantially transmissive to radiation from said source, said fourth portion defining an opening through said member, and said third portion being a part of said member that is free of an opening through said member, said opening defined by said fourth portion having opposite side edges that each extend transversely to a direction of movement of said fourth portion, and said anti-reflection structure including said member tapering in thickness toward each said side edge of said opening defined by said fourth portion; and
wherein said rotating is carried out so that said first, second, third and fourth portions become successively aligned with said path of travel in a cyclic manner.

12. A method according to claim 8, including varying an effective size, in said direction of movement of said second portions of said opening defined by said second portion.

13. A method according to claim 8, including measuring a level of radiation detected by said detector while carrying out said moving of said detector calibration reference.

* * * * *